United States Patent [11] 3,615,217

| [72] | Inventors | John F. O'Brien;<br>Edward K. Dienes; Arthur L. Hausberger,<br>all of Louisville, Ky. |
|---|---|---|
| [21] | Appl. No. | 560,827 |
| [22] | Filed | June 27, 1966 |
| [45] | Patented | Oct. 26, 1971 |
| [73] | Assignee | Catalysts & Chemicals, Inc.<br>Louisville, Ky. |

[54] LOW TEMPERATURE COPPER-ZINC SHIFT REACTION CATALYSTS AND METHODS FOR THEIR PREPARATION
4 Claims, No Drawings

[52] U.S. Cl. .................................... 23/213,
23/55, 75/117, 252/412, 252/463, 252/475
[51] Int. Cl. ........................................... C01b 1/00,
B01j 11/00, B01j 11/26
[50] Field of Search .................................... 23/55, 213;
75/117; 252/475, 476, 463, 438, 412

[56] References Cited
UNITED STATES PATENTS

| 1,797,426 | 3/1931 | Larson | 252/475 |
|---|---|---|---|
| 2,034,077 | 3/1936 | Arnold et al. | 252/476 |
| 2,275,181 | 3/1942 | Ipatieff et al. | 252/475 |
| 2,386,957 | 10/1945 | Ipatieff et al. | 252/475 |
| 2,647,832 | 8/1953 | Allen, Jr. et al. | 75/117 |
| 2,733,990 | 2/1956 | Van Hare et al. | 75/117 |
| 2,912,305 | 11/1959 | Wagner | 23/55 |
| 3,168,462 | 2/1965 | Erickson | 252/412 |
| 3,303,001 | 2/1967 | Dienes | 252/475 |
| 3,374,183 | 3/1968 | Cooper | 252/463 |
| 3,388,972 | 6/1968 | Reitmeier et al. | 252/475 |
| 1,956,585 | 5/1934 | Oglesby et al. | 252/459 X |
| 3,235,515 | 2/1966 | Taylor | 252/472 |

FOREIGN PATENTS

| 926,235 | 5/1963 | Great Britain | 252/472 |

*Primary Examiner*—Daniel E. Wyman
*Assistant Examiner*—P. E. Konopka
*Attorney*—Norman L. Wilson, Jr.

ABSTRACT: It is known that if a copper oxide-zinc oxide catalyst is made by specific techniques the catalyst when reduced at moderate temperatures permits a high conversion of carbon monoxide in water gas to hydrogen and carbon dioxide at a temperature of 550° F. and lower. The catalyst can also contain alumina. Improved low temperature copper-zinc shift catalysts can be made by concomitantly precipitating copper carbonate and zinc carbonate, the zinc carbonate precipitation commencing first, by thermally decomposing an aqueous solution having dissolved therein both copper ammine carbonate and zinc ammine carbonate.

LOW TEMPERATURE COPPER-ZINC SHIFT REACTION CATALYSTS AND METHODS FOR THEIR PREPARATION

This invention in one of its aspects pertains to low-temperature shift reactions, and to methods for preparing low-temperature shift reaction catalysts. In another of its aspects the invention relates to improved catalysts for such low-temperature shift reactions. In still another of its aspects the invention relates to a reclaiming process for spent shift catalysts.

The most important uses of hydrogen today are its use in the petrochemical industry, and for the synthesis of ammonia. To produce hydrogen for these purposes a gas reforming process is generally used. In gas reforming, natural gas, or a low molecular weight hydrocarbon such as methane, ethane, propane, or naphtha, is usually reacted with steam. Steam and hydrocarbons when passed over a catalyst containing certain metals, such as a metal of group VII, form hydrogen, carbon monoxide and carbon dioxide. In a second stage of this well known and commercial process for hydrogen preparation the process is operated to bring about a water gas shift reaction by which carbon monoxide and water, or steam, are reacted to form carbon dioxide and additional hydrogen. The carbon monoxide is thus converted to carbon dioxide because carbon dioxide can be removed more readily from the system, producing more pure hydrogen.

In the production of hydrogen from water gas, or other carbon monoxide-containing gases, and steam, it is the practice to pass the water gas over a shift catalyst, the following reaction occurring:

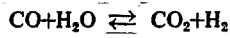

$$CO + H_2O \rightleftarrows CO_2 + H_2$$

The temperature at which this reaction is generally carried out is 750° F. to 850° F. Unfortunately, catalyst life at these temperatures is short compared to low temperature catalysts. In addition the required high temperatures do not favor the above equilibrium. The equilibrium shifts to the right, that is, to the production of hydrogen, as the temperature is decreased. In order to overcome this difficulty it has been the practice to increase the amount of steam in order to shift the equilibrium in the desired direction. This invention is based on the catalysts which favor the equilibrium by permitting the water gas shift reaction to be carried out at temperatures of 600° F. to 300° F. more specifically 500° F. to 350° F.

Catalysts formerly employed in a water gas shift reaction are iron-chromium catalysts, such as $Fe_2O_3$ in combination with 1 to 15 percent by weight of $Cr_2O_3$. However, a reduced copper oxide-zinc oxide catalyst ($CuO \cdot ZnO$) is disclosed for this purpose in U.S. Pat. No. 3,303,001. It was found that if a copper oxide-zinc oxide catalyst was made by a specific technique following the teachings of that invention the resulting catalyst, when reduced at moderate temperatures permitted a high conversion of carbon monoxide in water gas to hydrogen and carbon dioxide at a temperature of 550° F. and lower, say 500° F. to 350° F.

In accordance with U.S. Pat. No. 3,388,972, filed Dec. 14, 1966 it was found that thermal-resistance and physical properties of low-temperature copper oxide-zinc oxide shift catalysts were improved by the combination of these oxides with a selected quantity of alumina as a modifier. The modified low-temperature copper oxide-zinc oxide shift catalyst nevertheless still contains zinc oxide and copper as its active ingredients after reduction, in a weight ratio based on metal of 0.5 to 3 zinc to 1 copper. The alumina is generally added as alumina hydrate which may contain anywhere from one-half to three molecules of water of hydration per molecule of alumina. Alumina per se can be used in the preparation but the hydrate is preferred because of the forming characteristics of the powder containing the alumina hydrate. A nonhydrated alumina such as activated alumina or calcined alumina will cause equipment wear and lead to a more costly operation.

One aspect of U.S. Pat. No. 3,303,001 concerns the sodium level in the low-temperature shift catalyst. It was found that the quantity of sodium, generally present in the final catalyst as the oxide, markedly affects the performance of the copper-zinc catalyst. Hence the sodium content of low-temperature copper-zinc catalysts should not exceed 0.2 percent based on metal. Preferably it does not exceed 0.05 percent based on sodium metal. It is, however, necessary to precipitate copper and zinc as their carbonates. This means that it is necessary to remove sodium contaminants. The precipitated carbonates must be washed, either by repeated decantation, by the use of conventional thickening apparatus or by calcining the cake to the oxides and then reslurrying the oxides with water and filtering.

According to this invention, a process is provided for making low-temperature copper-zinc catalysts which are precipitated as copper and zinc carbonates, but which are not made by double decomposition using alkali metal salts. This process, therefore, overcomes the need for repeated washing to remove sodium salts. More important, by the process of this invention the properties of copper-zinc catalysts are even further improved over those of U.S. Pat. No. 3,303,001 and U.S. Pat. No. 3,388,972. The resulting combined copper oxide-zinc oxide composition is thus a new composition of matter. This is also true of the reduced composition yielding a copper-zinc oxide catalyst. The invention provides an improved process for preparing low-temperature copper-zinc shift catalysts made from aqueous copper and zinc carbonates by separating the insoluble carbonate salts from the aqueous medium and heating the salts until carbon dioxide is liberated thereby forming copper and zinc oxides. However this invention contemplates precipitating the copper carbonate in the presence of zinc carbonate by thermally decomposing an aqueous solution having dissolved therein both copper ammine carbonate and zinc ammine carbonate. This solution on heating (160°–210° F.) decomposes evolving ammonia and carbon dioxide resulting in the formation of basic carbonates of the metals which are separated out by filtration. These basic carbonates have been determined to have a structure of $Cu \cdot CO_3 \cdot 47 Cu(OH)_2 \cdot 15H_2O$ and $ZnCO_3 \cdot 47Zn(OH)_2 \cdot 15H_2O$. The basic carbonates are then decomposed by calcining (700° F.) to give the oxides (CuO and ZnO) with $CO_2$ and $H_2O$ being liberated. Thus by this process rather than forming copper and zinc carbonates by reaction of soluble copper and zinc salts with sodium or other alkali metal carbonates by double decomposition, copper and zinc ammine carbonates are prepared. These can be prepared separately or in situ. The mixture is then decomposed to form the copper and zinc carbonates. The ammine carbonate will be a polyammine, normally zinc or copper tetraammine. However di and tri ammines can also be made.

As indicated, one of the advantages of preparing the copper and zinc carbonates from the ammine rather than by double decomposition is that a novel and different composition of matter results. The differences in compositions achieved by this ammine method are attributed to the sequence of precipitation of the active ingredients (copper and zinc). This can best be understood in terms of the instability constants of the complexes involved. The instability constants of copper and zinc tetraammine complexes are $3.4 \times 10^{110}$ for $Zn(NH_3)_4^{2+}$ and $4.7 \times 10^{115}$ for $Cu(NH_3)4^{2+}$. Since the stability of a complex is measured by the extent to which it dissociates and the instability constant of zinc is sufficiently below copper, the zinc tetraammine dissociates first and precipitates before the copper tetraammine. The zinc precipitating first results in the copper precipitating on the zinc which gives a catalytic structure of enhanced properties, and this has been verified in the laboratory. In the case of alumina modification the zinc precipitates on the alumina with the copper in turn precipitating on both, giving a better resistance to heat. It is this sequence of precipitations that gives a catalytic structure having increased activity and resistance to heat. The result is an improvement in stability, activity and density of the shift catalyst provided herein.

In preparing the zinc and copper polyammine carbonates in plant batches the metals are incorporated in an aqueous solution containing the necessary reactants, that is, carbon dioxide, ammonia and oxygen or air. If metal oxides are employed, air is not necessary. In the laboratory it is preferred to start with aqueous solutions of ammonium hydroxide and ammonium bicarbonate, which will be equivalent to otherwise introducing the gases. A stoichiometric amount of ammonia and carbon dioxide to the copper and zinc metals is desirable. However quantities greater than stoichiometric ammonia and carbon dioxide can be used. Lesser quantities of ammonia result in the tri and di ammines also contemplated herein.

For a more complete understanding of the invention, various methods of preparing the novel catalysts of the invention, and of the advantages of first precipitating zinc oxide, reference is made to the following specific examples.

EXAMPLE I

In order to obtain activity data on various catalysts the following procedure was followed: 63.5 grams of copper were added to a solution of 182 grams of $NH_4OH$, 28 percent $NH_3$, 79 grams of $NH_4HCO_3$ and 310 ml. of water. Air was added at the rate of 13 to 14 cubic feet per minute and the reaction was carried out at 70° to 78° F. with vigorous agitation. When a 10 percent copper solution by weight based on the amount of $Cu(NH_3)_4O_3$ solution present was obtained the reaction was discontinued. The $Zn(NH_3)_4CO_3$ was prepared in a similar manner with 130.8 grams of zinc being dissolved in a solution of 364 grams of $NH_4OH$, 158 grams of $NH_4HCO_3$ and 655 ml. of water. The combined solutions of ammine carbonate salts were decomposed by heating to 180° F., filtered, dried at 220° F., and calcined for 2 hours at 700° F.

The activity of the catalysts prepared by this and the following examples can best be exemplified using the activity constant $K_w$ as the basis for comparison. As used herein:

$$K_w = SV_{wet} \log \frac{1}{1 - \% \text{ conversion}}$$

where percent conversion is $$\frac{CO_2 \times 100}{CO + CO_2} \text{ (on outlet gas)}.$$

The activity constant $K_w$ is a simplified form of the reaction rate constant for a first-order reaction. It may not adequately express the true mechanism of the shift reaction over the catalysts in mathematical terms. However, it has been found to be a reliable means of expressing the activity from bench scale tests and for designing commercial units. This is true for the range of conditions under which the catalysts are being operated today. The calculation of reaction rate constants for the water-gas shift reaction from expressions set forth by other observers has either yielded essentially no differences in the volumes that would be calculated for the required performance by the $K_w$ expression, or, are less satisfactory.

The conversions herein for the most part were determined at 400° F. for $CO + H_2O = CO_2 + H_2$. Hence $K_w$ conversions were obtained in an isothermal reactor comprising a jacketed iron pipe under the following:

| Process Conditions | Gas Mixture |
|---|---|
| Pressure: 150 p.s.i.g. | Carbon Monoxide 25% |
| Temperature: 360° F. & 400° F. | Hydrogen 75% |
| Space Velocity: dry-4,500 | |
| Space Velocity: wet-9,000 | |
| Steam-Gas Ratio: 1:1 | |

Under the foregoing process conditions and following the procedure of example I various copper-zinc low-temperature shift catalysts were prepared. Activities and physical properties of these catalysts are given in table IA.

TABLE IA

| Preparation No. | Surface Area m.²/gm. | Density Tablet lbs./cu.ft. | Activity $K_w$ 400° F. | Thermal Stability |
|---|---|---|---|---|
| E949-B | 32.6 | 62.6 | 15,000 | 8,430 |
| E940 | 35.5 | 63.5 | 13,520 | 7,650 |
| E916-A | 55.2 | 55.2 | 12,008 | |

Catalysts prepared according to this invention are superior to those made by double decomposition. This can be seen in table IB. Preparation A is a plant batch prepared according to example 5 of U.S. Pat. No. 3,303,001. Preparation B is a preparation according to example I.

TABLE IB

| Preparation No. | Surface Area m.²/gm. | Density Tablet lbs./cu.ft. | b Activity $K_w$ 400° F. |
|---|---|---|---|
| A | 44 | 80 | 11,700 |
| B | 45 | 61.8 | 14,300 |

As can be seen from table IB the process of this invention makes a catalyst which is much superior in both activity and density to the highly commercial catalyst prepared according to U.S. Pat. No. 3,303,001.

The effect of the ammonia and carbon dioxide on the final catalyst is illustrated in table IC. The usual method of preparation is such that a stoichiometric amount of ammonia and carbon dioxide is employed to react with the copper and zinc. However, as can be seen from table IC excess ammonia and carbon dioxide can be used without detrimental effects.

TABLE IC

| Preparation No. | Stoichiometric excess | | Tablet density, lbs./ft.³ | Surface area, m.²/g. | Activity, $K_w$ at 400° F. | Thermal stability, $K_w$ at 400° F. |
|---|---|---|---|---|---|---|
| | $NH_3$ | $CO_2$ | | | | |
| AB | 1 | 1 | 61.8 | 45 | 14,300 | 10,800 |
| E916-A | 1.5 | 1.5 | 55.2 | 65 | 12,800 | |
| E949-B | 2.0 | 2.0 | 69.9 | 32.6 | 15,000 | 8,430 |

The foregoing tables demonstrate that low-temperature shift catalysts prepared by example I possess outstanding activities, thermal stability values, and densities.

Variations of our preferred method of preparing the catalysts contemplated herein are illustrated by the following examples.

EXAMPLE II

One hundred sixty-eight grams of zinc oxide were dissolved in a solution of 1280 cc. $NH_4OH$, 500 grams $NH_4HCO_3$ and 900 grams water with rapid mixing. One hundred twenty grams $CuCO_3 \cdot Cu(OH)_2$ were added with the solution being diluted to 10 liters with water to give a 1.34 percent zinc, 0.67 percent copper, 4.32 percent ammonia, and 2.78 percent $CO_2$ solution. The solution was decomposed by heating the 180° F., filtered, dried at 110° C., and calcined for 2 hours at 700° F. Graphite was added and the material formed into tablets.

TABLE II

| Preparation No. | Percent Metals | Surface Area m.²/gm. | Density Tablet lbs./cu.ft. | Activity $K_w$ 400° F. |
|---|---|---|---|---|
| 49-13-1 | 2 | 45 | 63 | 15,300 |

EXAMPLE III

Four thousand nine hundred and thirty ml. of an aqueous solution of $Cu(NH_3)_4 CO_3$ which contains 1.34 grams of copper per 100 ml. of solution and has a 4:1 mol ratio of $NH_3$ to Cu and a 1:1 mol ratio of $CO_2$ to Cu were mixed with 9,650 ml. of a $Zn(NH_3)_4CO_3$ solution containing 1.39 grams of zinc per 100 ml. of solution and had a stoichiometric amount of $NH_3$ and $CO_2$ to Zn. The solution was diluted to 10 liters with water. The mixture of tetraammine carbonates was thermally decomposed at 180° F. to give a mixture of 2 zinc basic carbonates to copper basic carbonates as shown by chemical analysis. The carbonates were decomposed to the oxides by calcining for 4 hours at 700° F. A yield of 92.4 percent on an oxide basis resulted. The resulting oxides were formed into tablets (3/16×3/16 inch) by the addition of 3 weight percent graphite and recalcined for 4 hours at 700° F. The properties of the pellets were as follows: $K_w$ at 400° F.=14,300; surface area = 45 square meters per gram; tablet density = 61.8 pounds per cubic foot; pellet crush strength (DWL-Lbs) = 18; and sodium = 0.0 weight percent.

As indicated hereinbefore it was previously found that the physical properties of the copper-zinc catalyst of U.S. Pat. No. 3,303,001 could be improved by the use of alumina as a modifier as set forth in U.S. Pat. No. 3,388,972. An advantage of the process described herein is that even this alumina modified low-temperature copper-zinc shift catalyst is improved by the process of the invention. Moreover, by this process, during decomposition the zinc precipitates on the alumina, the copper precipitating on both to give still a different composition of matter. The addition of alumina to the catalyst to give improved thermal stability is accomplished as follows:

EXAMPLE IV

To a solution of 986 ml. $Cu(NH_3)_4CO_3$, containing 6.75 grams of copper per 100 ml. solution, and 2440 ml. $Zn(NH_3)_4O_3$, containing 5.45 grams of zinc per 100 ml. of solution, there were added 74.0 grams of hydrated alumina so that the quantity of $Al_2O_3$ is 16.0 percent of the copper oxide-zinc oxide alumina composition. Both compositions contained a stoichiometric amount of $NH_3$ and $CO_2$ to Zn and Cu to form the tetraammine. The alumina was introduced with constant agitation and the resulting mixture was thermally decomposed at 180° F. The resulting precipitate was filtered, calcined at 700° F. for 5.5 hours, and tabletted by the addition of 3 weight percent graphite and recalcined for 4 hours at 500° F. The properties of the pellets were as follows: $K_w$ at 400° F.=17,620; surface area = 105 square meters per gram; tablet density = 48.9 pounds per cubic foot; pellet crush strength = 19 pounds (DWL). The thermal stability was determined by subjecting the catalyst to a mixture of steam and hydrogen (1 part $H_2$:1 part steam by volume) at 700° F. for 16 hours. This accelerated test produces a reduction in both surface area and $K_w$ value. The activity after thermal stability testing was $K_w$400° F.=8,540 showing a marked improvement by the use of alumina. Another improvement is evidenced by the lower tablet densities resulting.

Table III gives a comparison of alumina modified copper-zinc catalysts prepared by the process of U.S. Pat. No. 3,388,972 and by the process of this invention. Preparations A and B, previously described, do not contain alumina. Preparation C is example 3 of U.S. Pat. No. 3,388,972 wherein $Al_2O_3$ was added, and it is based on data acquired on actual commercially produced material. Preparation D is an example of the present invention with added alumina. Preparation E is example V of the present invention.

TABLE III

| Preparation No. | Percent $Al_2O_3$ | Surface area, m.²/g. | Density, lbs./ft.³ | Activity, $K_w$ at 400° F. Initial | Thermal |
|---|---|---|---|---|---|
| A | 0 | 44 | 80 | 11,700 | 8,500 |
| B | 0 | 45 | 61.8 | 14,300 | 10,800 |
| C | 16.7 | 114 | 80 | 12,000 | 8,500 |
| D | 16.7 | 105 | 48.9 | 17,620 | 9,560 |
| E | 16.7 | 94.4 | 68.6 | 15,200 | 12,520 |

An improved density and an improvement in activity of consequence results from the use of the process of this invention. A substantial increase in thermal stability is also realized by the process of the present invention.

TABLE IVA

| Preparation No. | Percent $Al_2O_3$ | Surface area, m.²/g. | Density, lbs./ft.³ | Activity, $K_w$ at 400° F. Initial | Thermal |
|---|---|---|---|---|---|
| B | 0 | 45 | 61.8 | 14,300 | 10,800 |
| D | 16.7 | 105 | 48.9 | 17,620 | 9,560 |
| E960-C | 28.8 | 109 | 66.1 | 11,580 | 9,720 |
| E960-B | 42.3 | 114 | 69.0 | 11,630 | |
| E960-A | 50.0 | 109 | 66.7 | 11,600 | 11,400 |
| Prep. A | 0 | 44 | 80 | 11,700 | 8,500 |
| Prep. C | 16.7 | 114 | 80 | 12,000 | 8,500 |

The process of the present invention gives lower product densities than previous methods of manufacturing (Preparation A and C). Improved initial activity and thermal stability also results by use of the ammine process. Increasing the amount of alumina does not decrease either the initial or thermal activity. One to 75 percent by weight alumina can be used, desirably 20 to 50 percent, if alumina is used at all. Increasing the amount of alumina thus permits dilution of the active ingredients (Cu and Zn) without any loss in activity or stability, as seen in table IVA.

TABLE IVB

| Preparation No. | Zn/Cu | Percent $Al_2O_3$ | Tablet density, lbs./ft.³ | Surface area, m.²/g. | Activity, $K_w$ at 400° F. |
|---|---|---|---|---|---|
| E944-A | 1.5:1 | 16.7 | 53.6 | 83 | 7,400 |
| E939-B | 2:1 | 16.7 | 48.9 | 105 | 17,620 |
| E944-B | 3:1 | 16.7 | 59.1 | 78.3 | 2,280 |

It can be seen that a mol ratio of 2 Zn to 1 Cu gives the best activity. However a ratio of 0.5 to 3 Zn to 1 Cu can be employed.

The effect of the concentration of metals (Cu and Zn) in the tetraammine carbonate solutions decomposed is shown in table IVC.

TABLE IVC

| Preparation No. | Percent metals (Cu+Zn) | Percent $Al_2O_3$ | Tablet density, lbs./ft.³ | Surface area, m.²/g, | Activity, $K_w$ at 400° F. Initial | Thermal |
|---|---|---|---|---|---|---|
| E951-A | 2 | 16.7 | 63.7 | 89.0 | 11,400 | 8,990 |
| E939 | 4 | 16.7 | 48.9 | 105.0 | 17,620 | 8,540 |
| E949-A | 6 | 16.7 | 62.4 | 94.5 | 13,700 | 9,450 |
| E966 | 10 | 16.7 | 65.0 | 85.6 | 10,320 | 9,490 |

As can be seen, lower density, increased initial activity and thermal stability result over previous methods of preparation. No diverse effects were noted by decomposing solutions of various metal concentrations. However the concentration usually will be in the range of 0.5 to 20 percent metals (copper and zinc), preferably 4 to 10 percent.

The effect of decomposition temperature of the metal tetraammine carbonates solutions on the properties of the catalysts can be seen in table IVD.

TABLE IVD

| Preparation No. | Decomposition temp., °F. | Percent Al₂O₃ | Tablet density, lbs./ft.³ | Surface area, m.²/g. | Activity, $K_w$ at 400° F |
|---|---|---|---|---|---|
| E955-A | 160 | 16.7 | 83.6 | 81.5 | 7,700 |
| E939 | 180 | 16.7 | 48.9 | 105.0 | 17,620 |
| E961 | 206 | 16.7 | 74.2 | 91.0 | 10,000 |

A temperature range of 160 to 210° F. is desirable to produce catalysts of improved activity and lower density.

It is understood that the decomposition of the copper and zinc tetraammine carbonates can be accomplished by either batch or continuous processes. An example of continuous operation is as follows.

EXAMPLE V

A premix solution of copper and zinc tetraammine carbonates containing 4 g. metals/100 ml. (i.e., 1.33 g. Cu/100 ml. and 2.67 g. Zn/100 ml.) and enough hydrated alumina to give 16.7 percent $Al_2O_3$ on the finished catalyst was pumped to a decomposer vessel of 6 liters in size equipped with an overflow line. The rate of addition to the decomposer was 50 CC/min giving a complete change of premix solution through the decomposer once every 2 hours. After lining the system out at 206° F. for 4.75 hours a sample of slurry from the overflow of the decomposer was taken for a period of 1.5 hours. This slurry was filtered, calcined at 700° F. to give 211 g. 2 percent graphite by weight was added and formed by tabletting to 3/16 inches × 3/16 inches. The tablet strength was 20 lbs. (DWL), and the density was 68.6 lbs./ft. 3. The activity was: $K_w$ at 400° F. initial 15,200 and after thermal stability testing $K_w$=12,520.

Another advantage of one of the facets of this invention is the recovery of copper and zinc values from spent catalysts. Heretofore, insofar as we have been able to determine, no attempt has been made to reclaim copper-zinc catalysts. Nitric acid, which would be used to dissolve the metals to form soluble nitrates for precipitation, tends, in part, to dissolve impurities. When the soluble nitrate solution is filtered, these dissolved impurities remain in the solution, as can be seen from the fact that they become occluded or otherwise deposited on the subsequently formed carbonate precipitate. Catalytic materials made from spent copper-zinc catalysts have not therefore had the required activity for low-temperature shift catalysts. This aspect of the invention is illustrated in examples VI and VII. These examples show that aqueous solutions containing ammonia, carbon dioxide, and oxygen can be used to dissolve the catalysts. In addition to the recovery of copper and zinc values from spent catalysts, it will be understood that catalysts can also be made from impure or contaminated metals. This aspect of the invention is shown in example VII.

EXAMPLE VI

A batch of catalyst prepared according to example 5 of U.S. Pat. No. 3,303,001 after prolonged use had an activity of $K_w$=4,500. This catalyst was dissolved in dilute nitric acid to again form zinc and copper nitrates. To this solution of nitrate salts sodium carbonate was added to reform zinc and copper carbonates. After decomposition to the oxides and calcination at a temperature of 700° F. the reclaimed catalyst was tested under the conditions set forth following example I. The $K_w$ value of the reclaimed catalyst was 4,000, compared to its initial value of 4,500.

EXAMPLE VII

A bed of catalyst prepared according to example 3 of U.S. Pat. No. 3,388,972 was removed from a commercial unit because of a drop in activity of over 50 percent due to prolonged use. The catalyst was dissolved in a mixture of ammonium hydroxide and ammonium carbonate. This resulted in the formation of zinc tetraammine carbonate and copper tetraammine carbonate. The ammine carbonates readily dissolved, but the impurities did not. The impurities and alumina were filtered out. Following example I hereinbefore, the ammine carbonates were precipitated and then decomposed to form the copper-zinc catalysts. The reclaimed catalyst, when tested under the conditions set forth following example I, had an initial $K_w$ value of 10,650. Its thermal stability value was 8,780, and the tablet density was 67.5 lbs.

A second preparation was made by filtering off the $Al_2O_3$ on dissolving the copper and zinc oxides. Enough $Al_2O_3$-$H_2O$ was added to make a catalyst containing 30 percent $Al_2O_3$, with the ammine solution being decomposed, calcined at 700° F. and the material formed into tablets. The density was 69.2 lbs./ft.³ and the activity $K_w$ at 400° F. was 10,350 initial and 10,030 after thermal stability.

EXAMPLE VIII

Scrap copper metal was dissolved in nitric acid, the contaminants also dissolving. From this solution a low-temperature shift catalyst was prepared according to example 3 of U.S. Pat. No. 3,388,972. The resulting catalyst exhibited an initial activity $K_w$ at 400° F. of 4,500. This low activity was traced to the contaminants in the copper metal employed. X-ray fluorescence analysis showed the contaminants to be tin and lead (Pb=0.5 percent; Sn=0.02 percent). This inactive catalyst was subsequently dissolved in ammonium hydroxide and ammonium carbonate and a catalyst was prepared according to examples IV and VII. Enough alumina was added to make a catalyst containing 30 percent $Al_2O_3$. An active catalyst resulted having a $K_w$ at 400° F. of 10,250.

Examination of $K_w$ values of examples VI, VII and VIII shows that the presence of the impurities in a catalyst has an adverse effect upon the nitric acid process. As shown in example VIII the process of the present invention can be employed to utilize sources of contaminated copper or zinc metals, such as scrap metals. In addition, copper and zinc values of catalysts which have been inactivated by metal contaminants can also be recovered. The catalyst thus is reactivated by the process of this invention. When the spent catalysts are reformed according to the process of this invention the activity of the reformed catalysts is approximately the same as that of new low-temperature copper-zinc catalyst.

Several embodiments and variations of this invention have been illustrated herein, the most important of which is that only this method and that described in U.S. Pat. No. 3,303,001 result in a low-temperature shift catalyst. Other processes known to us, which result in copper and zinc oxides, do not give catalysts which function as shift catalysts at temperatures below 500° F. However, while the catalysts contemplated herein are primarily shift catalysts other uses will occur to those skilled in the art. Such obvious ramifications are deemed to be within the scope of this invention.

We claim:

1. A low-temperature shift catalyst giving high conversion in a shift reaction at a temperature of about 350° F. to about 550° F. comprising a coprecipitate of zinc and copper carbonates subsequently calcined to the oxide and reduced to a zinc oxide-copper catalyst having improved physical properties and containing zinc and copper in a mol ratio of from 0.5:1 to 3:1, said catalyst being prepared from an aqueous mixture of copper and zinc polyammine carbonates by heating said mixture of polyammine carbonates in aqueous solution in the absence of a support or in the presence of alumina at a temperature in the range of 160° F. to 210° F. to decompose said polyammine carbonates and form said coprecipitate and separating said coprecipitate from said solution prior to calcining.

2. The catalyst of claim 1 containing from 1 to 75 weight percent alumina based on the total composition.

3. The catalyst of claim 2 wherein the zinc to copper mol ratio is 2 to 1, and wherein alumina is present in an amount of 20 to 50 percent by weight.

4. In the process for producing hydrogen by a shift reaction by reacting steam with carbon monoxide at a temperature in the range of 350° F. to 500° F. the improvement of passing the steam and carbon monoxide over the catalyst of claim 1 at the reaction temperature.

* * * * *